United States Patent
Malofsky et al.

(10) Patent No.: US 6,912,809 B2
(45) Date of Patent: Jul. 5, 2005

(54) PLANT SUPPORT SYSTEM

(76) Inventors: Adam Gregg Malofsky, 12020 Millstone Ct., Loveland, OH (US) 45140; Robin Cindi Malofsky, 12020 Millstone Ct., Loveland, OH (US) 45140; Bernard Miles Malofsky, 12 Duncaster Rd., Bloomfield, CT (US) 06002

(*) Notice: Subject to any disclaimer, the term of this patent is extended or adjusted under 35 U.S.C. 154(b) by 0 days.

(21) Appl. No.: 10/374,596

(22) Filed: Feb. 25, 2003

(65) Prior Publication Data

US 2003/0159347 A1 Aug. 28, 2003

Related U.S. Application Data

(60) Provisional application No. 60/359,818, filed on Feb. 26, 2002.

(51) Int. Cl.[7] .............................................. A01G 17/04
(52) U.S. Cl. .......................................................... 47/47
(58) Field of Search ............................... 47/46, 47, 44; 48/1

(56) References Cited

U.S. PATENT DOCUMENTS

| | | | | |
|---|---|---|---|---|
| 687,283 A | * | 11/1901 | Springer | 47/47 |
| 1,676,468 A | | 7/1928 | Waterman | 47/47 |
| 2,000,632 A | | 5/1935 | Zingre | 47/47 |
| 2,009,668 A | | 7/1935 | Lay | 47/47 |
| 3,061,976 A | | 11/1962 | Carroll et al. | 47/47 |
| 4,433,083 A | * | 2/1984 | Cogswell et al. | 524/27 |
| 4,503,636 A | | 3/1985 | Stuckey | 47/44 |
| 4,519,162 A | | 5/1985 | Stucky | 47/47 |
| 4,860,489 A | * | 8/1989 | Bork | 47/47 |
| D303,340 S | * | 9/1989 | Waltel, Jr. | D8/1 |
| 4,907,369 A | | 3/1990 | Vomfell | 47/46 |
| 5,209,012 A | * | 5/1993 | Palmer | 47/17 |
| 5,711,107 A | | 1/1998 | Louisiana | 47/45 |
| D403,560 S | | 1/1999 | Ruggiero | D8/1 |
| D406,021 S | | 2/1999 | Grimes | D8/1 |
| D411,722 S | | 6/1999 | Grimes | D8/1 |
| 6,000,172 A | | 12/1999 | Ballarino | 47/47 |
| 6,088,956 A | | 7/2000 | Rocka | 47/45 |
| 6,122,859 A | | 9/2000 | Lazar | 47/44 |
| 6,209,258 B1 | | 4/2001 | Schneider | 47/46 |
| 6,302,368 B1 | * | 10/2001 | Tsappi | 248/523 |
| 6,357,174 B1 | * | 3/2002 | Hernick | 47/45 |

FOREIGN PATENT DOCUMENTS

| | | | | |
|---|---|---|---|---|
| DE | 2262480 A | * | 6/1974 | A01G/17/04 |
| DE | 20302014 U1 | * | 6/2003 | A01G/9/12 |
| GB | 2179833 A | * | 3/1987 | A01G/17/04 |
| JP | 2002325516 A | * | 11/2002 | A01G/17/10 |

* cited by examiner

Primary Examiner—Son T. Nguyen
(74) Attorney, Agent, or Firm—Alfred J. Mangels (57) ABSTRACT

A virtually continuously adjustable plant support system utilizing oriented, high-modulus fiber-reinforced plastic matrix composites and plastics to form a three component plant system that can be assembled into a virtually infinite array of plant support configurations. The system includes at least one stake, at least one coupling element that can be slidably received on the stake for adjustment of its position on the stake. The coupling element includes through passageways for receiving a fiber-reinforced strand that passes through the coupling elements to position the strands in a desired orientation to support a plant. The strands are flexible and have structural memory. A loop defined by a strand can be of any desired diameter, which can be readily changed as needed or desired to accommodate a particular plant configuration.

21 Claims, 5 Drawing Sheets

PLANT SUPPORT SYSTEM

CROSS-REFERENCE TO RELATED APPLICATION

This application claims the benefit of U.S. Provisional Application No. 60/359,818, filed on Feb. 26, 2002.

BACKGROUND OF THE INVENTION

1. Field of the Invention

The present invention relates to a plant support system. More particularly, the present invention relates to a plant support system that enables simple and quick adjustability of the support to accommodate different shapes of plants and also to accommodate plant growth, and wherein the support includes loops formed from thin, fiber-reinforced strands to avoid rusting and corrosion and to render the system less visually obtrusive to a casual observer.

2. Description of the Related Art

Typically, low to moderate height (less than about eight feet) growing plants, such as flowers and various types of vegetables, such as beans, peas, and the like, are supported by plant supports that Include stakes. The stakes are placed in the ground adjacent to the plant and one or more ties are provided to encircle either the main stalk of the plant or branches that extend from the main stalk. The ties define loops that surround the main stalk or a branch. Other forms for such types of plant supports can be based upon providing several stakes, where lateral support is provided either by individual loops or by a continuous length of cord or strand that extends between the several stakes to support the plant. Most known plant support systems rely upon metal stakes. And although plant supports have been designed that solve some of the problems associated with such supports, all have the common defect of utilizing either a metal strand or a cumbersome, non-reinforced, relatively limp components to prevent the relatively thick strand from kinking or having such a spring force, given the large dimensions, that only a multi-component system can hold them in place.

Complex systems are required to align and position the predominant metal strand polymeric material to provide the lateral support.

The most prevalent plant support materials are vinyl or epoxy-coated steel or galvanized steel. All are essentially fixed size components, not readily adjustable (with respect to all three components, if all three exist?). To accommodate various situations, many different products and components are required with relatively complex configurations, such as crimps, kinks, locks, slides, and the like. By virtue of their ferrous or aluminum content, the metal components require coatings or surface treatments of some type to be able to withstand the environment. All such coatings have limited lifetimes because of their inherent composition, and also because of the presence of an interface between the metals and the coatings.

The ferrous and aluminum components can kink or bend, and in order to have strength they require substantial mass. Kinks and bends can lead to premature failure or deterioration in performance, and when they do or do not detract from performance they are no longer attractive. The substantial mass and requisite methods of connection further limit performance and adjustability. Additionally, to prevent kinking and still have sufficient strength, such mass is required that any memory or spring force is so high as to require built-in means beyond simple friction to maintain the relative position of such lateral support members to the stakes or to each other. Finally, this substantial mass and substantial size can detract from the desired physical appearance of seeing only the plant.

While some materials have been designed and built utilizing cast or molded fiberglass mat reinforced plastics for decorative trellises or simple stakes, they are heavier, not adjustable, and lack oriented, anisotropic strength characteristics that provide for structural memory. It would be desirable if a system could be devised that combined the virtues of metals without the limiting factors of metals, or the inherent weakness of unreinforced plastics, and that was so versatile as to dramatically reduce the number of components required to produce an infinite array of plant supports. It would also be desirable to be able to employ a material where strength was maximized, but dimensions and volume of material utilized were minimized, and if the material for most of the components possessed the sound dampening characteristics of the metals mentioned earlier, to connote a higher quality than simple plastics.

The following patents describe various types of known plant supports:

U.S. Pat. No. 4,907,369 (Vomfell) describes a belt-type of plant support made from polymeric material. The belt is passed through apertures provided in the stake and is connected at its ends to form a hoop. While partially solving some of the problems mentioned above, the polymeric belt has no significant memory to return to on original orientation until it is grossly deformed. Furthermore, because it possesses no fiber reinforcement of any kind, the belt will twist under the weight of the plant, unless the plant is woody, in which case support would likely be unnecessary. Finally, the requirement for fixed configuration, elongated apertures in the stakes adds manufacturing steps, and it also removes the ability to continuously adjust the heights and the number of the support hoops along the stake. Finally, to provide the necessary strength, polymeric belts of relatively large cross section are required that will be highly unattractive where decorative gardening is concerned, not to mention the costs related to using excess materials.

U.S. Pat. No. 6,209,258 (Schneider) describes a potted plant support system that has a flat base member that is securable to a plant pot with a key that secures the base member to the pot base. The plant is supported by a rod that can be notched to retain plant ties. The disclosed system can also include a rod support clip that engages the pot periphery and includes a rod support extension. Also disclosed is a plant support hook that slidingly engages the rod and that releasably engages itself to form a plant-retaining loop. The plant support loop can be used to hold the plant relative to the rod. In the preferred embodiment, the plant support loop (40) comprises a sleeve (42) that can slidingly engage the rod. The sleeve should preferably have the same shape as the cross-sectional shape of the rod to permit the sleeve to slide up and down the rod. The sleeve can then rest on support wedges. In the preferred embodiment, the sleeve is open so that pulling on the arms allows the sleeve to be expanded such that the support loop can be pulled past a wedge in either direction. Alternatively, if the rod is circular in cross section and has notches instead of wedges, the sleeve can be tubular. In that case, a setscrew can be provided to set the plant support loop at a desired height. The loop is in the form of two semi-circular arms that each end in closing hooks that extend from the sleeve. The two closing hooks can engage each other to close the loop formed by the arms and support the plant. Preferably, the arms are formed from a rigid material capable of elastic deformation so the arms can be easily manipulated to engage and disengage the hooks. It is further preferred if the hooks are at right angles to each other to facilitate engagement with each other.

The problem noted above is only partially solved by Schneider in an unduly complex manner with a device that cannot be continuously adjustable in all dimensions. Specifically, the loop structures described, and alternately employed by Peacock, Inc. in a different manner, are fixed in size and require a complex manipulation and manufacturing process. The loops are not continuously variable, can be easily seen, and are subject to corrosion, even if coatings and treatments are utilized to slow the process. In fact, coupling the loops to the sleeves permanently further limits their functional variability.

U.S. Pat. No. 6,122,859 (Lazar) describes a plant tie for securing a plant limb of a plant relative to a supporting member, for example, a plant stake. The tie is a soft flexible, elastic loop; more particularly the loop is of knitted material and is formed from a toe clip remnant of knitted hosiery manufacture. Here again, the problem of continuously variable support position is not solved. Rather, these ties solve a very specific problem where widely employed plant ties have the major disadvantage that they resist growth of the plant limb, which under normal growth enlarges, and they also restrict mobility of the plant limb relative to the stake. Only very small lengths can be used, and entire plants or groups of plants cannot be effectively supported.

U.S. Pat. No. 6,088,956 (Rocka) describes a foldable plant support system which provides a structure within which a plant can be grown and physically supported. A protective cover can be drawn over the support system to provide a protective environment for a plant contained within the cover, along with an irrigation system. The plant support structure has two or more vertical members and a number of cross members connected to each other by a rotatable connector assembly to provide the foldable feature of the structure. A vertical member typically is rod-like to extend the entire height of the structure, and it has attachment points where it is attached to a connector assembly. The vertical member also includes a staking structure that is used to anchor the plant support structure in place when in use. Loop shaped cross members are connected to and extend laterally from the vertical members, and each has attachment points for attaching the cross member to a connector assembly. The connector assembly provides a rotatable or pivotable attachment means for rotatably connecting a vertical member to a cross member. An exemplary connector is a hub and an axle assembly, with the hub having a passage for closely receiving and retaining one end of the axle. Again, the structure is unnecessarily complex, and is not at all variable, let alone continuously variable.

U.S. Pat. No. 6,000,172 (Ballarino) relates to an improved plant holder for use in a garden for supporting plants and vines as they grow and mature. The plant holder includes a plurality of identical posts that can be driven into the ground by means of pointed ends. Each post has a plurality of hooks in pairs at different heights along the post. Further, rods are provided between the posts and clip into the hooks to lie in a horizontal plane at each of the different levels of the hooks. Since the hooks are paired on either side of the posts at different levels, a pair of rods can also be found at the corresponding levels. Each pair of rods is connected by C-clips that snap over the rods. A plant, such as a tomato plant, can be supported by this structure by driving the posts on either side of the plant, assembling the rods into the hooks on either side of the plant stem, then applying the clips to secure the rods into position. Further, the clips are sufficiently spaced along the rods to allow a branch of the plant to be drawn through an opening in the clips for further support of the branches. Again, a highly complex, multi-part system that has only limited variability by design and material choice.

U.S. Pat. No. 5,711,107 (Louisiana) describes a complex, non-reinforced, multi-component system for supporting plants. Clear plastics, specifically acrylate polymers, are described as being especially useful. As already noted, unreinforced plastics require additional material for requisite strength, and if clear they will discolor over time. Furthermore, plastic materials will creep over time, causing slow, but eventual, plastic deformation that can lead to an unsightly device, an unusable device, and catastrophic failure under even moderate loading. This system is not continuously adjustable, and it requires a large number of different parts for manufacture and a large inventory to be significantly altered at all.

U.S. Pat. No. 4,519,162 (Stuckey) describes a plant vine support in the form of a post or stake member adapted to be driven into the earth and spaced a distance away from the plant or vine. A plurality of rings are provided, each ring having integrally formed stabilizing members for stabilizing the rings in vertical and horizontal planes, and connectors for detachably securing the rings to the post or stake. In one embodiment, pairs of passageways in the channel post receive pairs of locking hooks, and in another embodiment one of the locking hooks is a locking detent. Both embodiments are low in cost and can be easily manufactured. The component parts in both embodiments have relatively flat dimensions and can be transported easily, and they are easily assembled and disassembled and stored, and various size rings, frames, or hoops can be utilized in various combinations on a common post. Again, fixed size rings.

U.S. Pat. No. 4,503,636 (Stuckey) describes a plant vine support that utilizes a channel-shaped post having a U-shaped central portion. A pair of laterally-projecting flanges 15 with locking lug pairs integrally formed on the flanges and a locking lug and shoulders are provided in the U-shaped portion of the post. The ring is provided with a complementary locking structure that is coplanar with the ring support and is adapted to interengagingly locking maneuver as well as a simple unlocking and disassembling maneuver. The rings are simple, they stack flat, and they are far less susceptible of hooking with one another and thereby entangling themselves during storage. Again, a fixed system in terms of the sizes of the rings and their location along the stake.

U.S. Pat. No. 3,061,976 (Carroll et al.) describes rings that are continuously adjustable along a stake. The rings themselves are not adjustable in diameter, and they are made of plastic, particularly polyethylene.

U.S. Pat. No. 2,009,668 (Lay) describes rings that are continuously adjustable along a stake. The rings themselves are not adjustable in diameter and are an all-metal strand construction.

U.S. Pat. No. 2,000,632 (Zingre) describes a split strand loop that is variable in diameter by adjusting the relative engagement of the ends with reference to crimps along the loops. Metal strand construction, complex parts, and bending operations. Not continuously adjustable, requires hooking to fix positions. No vertical stake adjustment. It is worth noting that the dimension strand required not to kink again produces such a force as to make it very difficult to practice the invention without something beyond a simple crimp to engage the strand at smaller diameters.

U.S. Pat. No. 1,676,468 (Waterman) describes a stake construction having strand rings intertwined with a knit strand stake with an all-metal strand construction.

U.S. Design Pat. No. Des. 411,722 (Grimes) describes a simple, rigid, partially variable plant support ornamental design that illustrates a potentially useful configuration concept that would be more useful if it were continuously variable. The strand structures are fixed in length, and there is no indication as to a methodology of configuring the device.

U.S. Design Pat. No. Des. 406,021 (Grimes) also shows a simple, rigid, partially variable plant support ornamental design that illustrates a potential useful configuration concept that would be more useful if it were continuously variable. This reference only discloses simple loops, as also shown in other patents, and not multiple, complex shapes. No material specifications are disclosed. Further, the additional components must be fixed to at least one portion of the loop strand for any variation to be possible. If not assumed to be in a fixed position, then there are no means shown for maintaining position, particularly with strand. Even then, metal strand of sufficient dimension not to kink will not remain in position even if this design were variable. Finally, to fix the ends, one must then fix the ring to coupling element, and so variability is compromised and limited to only rings, particularly rings of half the circumference of the maximum circumference. Materials are critical to achieve a variable product.

U.S. Design Pat. No. Des. 403,560 (Ruggiero) is directed to a simple, loop-only stake design with fixed size loops and loop positions along the stake. No materials are specified.

BRIEF SUMMARY OF THE INVENTION

Briefly stated, in accordance with one aspect of the present invention, a plant support system is provided having at least one stake adapted to be pressed into soil adjacent to a plant to provide a substantially rigid support for the plant support system. At least one coupling element is engageable with an outer surface of the stake and has a least one through-passageway that is spaced from the outer surface of the stake. A plant restraint member is provided in the form of a thin, flexible strand of self-supporting material having a substantially constant cross section. The strand is adapted to be frictionally received within a through-passageway in the coupling element. The plant restraint member defines a flexible limiting member for supporting and for limiting movement of an adjacent plant.

BRIEF DESCRIPTION OF THE DRAWINGS

The structure, operation, and advantages of the present invention will become further apparent upon consideration of the following description, taken in conjunction with the accompanying drawings in which.

DETAILED DESCRIPTION OF THE INVENTION

This present invention solves the problems noted above in connection with presently-available plant supports and plant support systems. Oriented, reinforced plastic matrix composites and plastics are utilized to provide plant support components in the form of stakes, coupling elements, and support strands that can be combined to form a simple, three-component plant support system that can be arranged in a virtually infinite array of plant support configurations.

The present system includes structural memory components and provides continuously variable positioning capabilities. The materials do not require paint or anticorrosion coatings, and they can last many more years than the previously-mentioned ferrous- and aluminum-based supports. Further, the specific use of oriented, reinforced plastic matrix composites for the flexible support strands allows for such a small cross-sectional strand dimension that the support strands cannot be easily visually noted without close or intentional inspection. Furthermore, by reducing the size of the support strands, relative to the prior art approaches, and by utilizing oriented, reinforced plastic matrix composites, friction fits can be utilized for strand connection and strand retention purposes, as opposed to complex mechanical means or the use of additional connection components. Finally, a vast array of plant support system conformations are possible from simple lines and loops, to rosettes, multiple overlapping or adjacent loops, and the like, for supporting single plants, groups of plants, or multi-stemmed plants of various forms.

Figure 1:
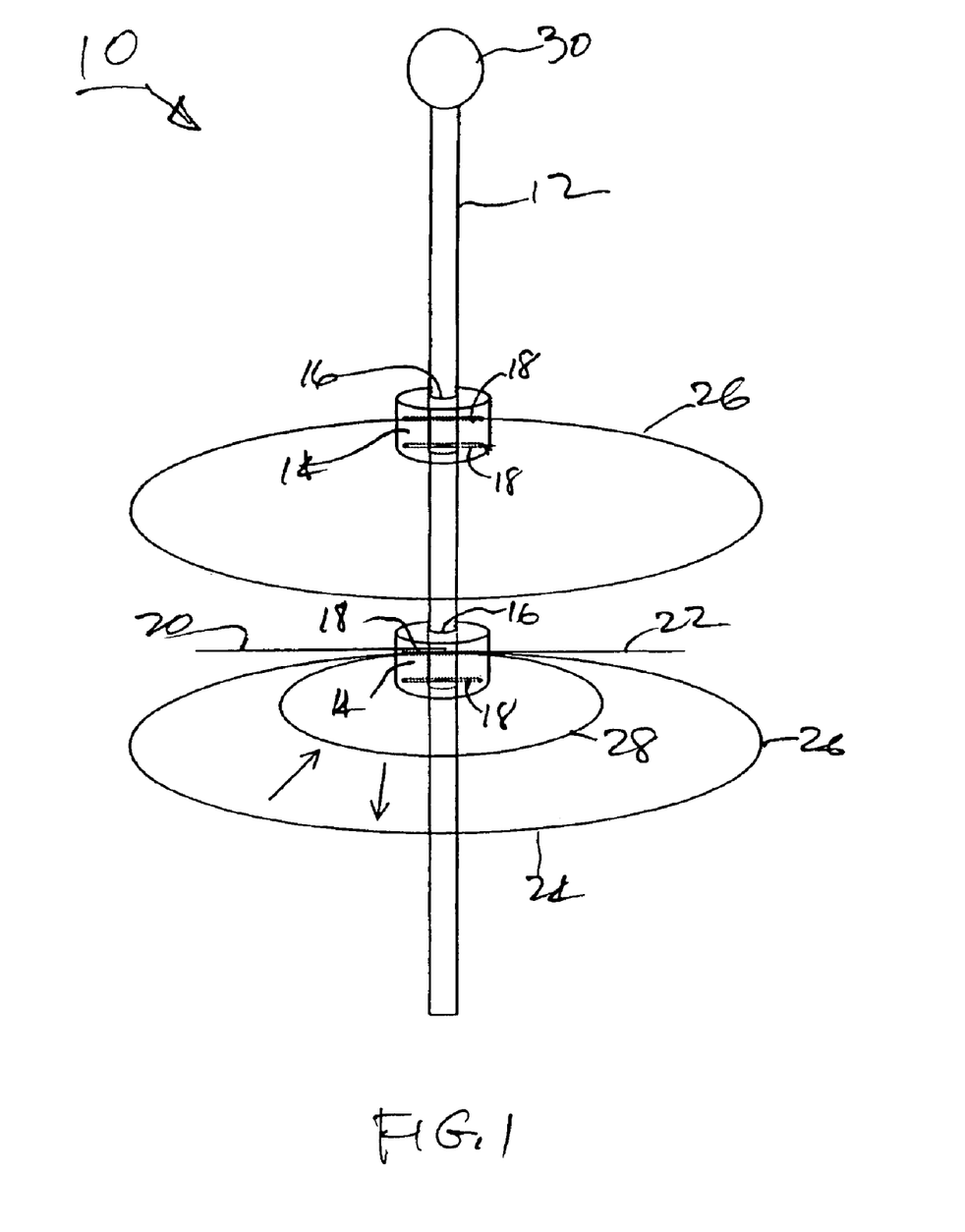
FIG. 1 is a perspective view of an embodiment of a plant support including a stake, coupling elements, and plant support strands.

In the simplest embodiment of the present invention, only three basic components are required: a stake; a spool of a flexible, fiber-reinforced composite, non-kinking, substantially constant profile support element (composite strand); and coupling elements that receive the support elements in the form of composite strands and allow the support elements to be affixed to the stakes. Referring to the drawings, and particularly to FIG. 1 thereof, there is shown a plant support arrangement 10 in the form of a basic support loop. A substantially vertically disposed take 12 is placed in the ground adjacent to a plant (not shown) and a coupling element 14 is positioned along the stake at a desired height above the ground. Coupling element 14 includes a central, longitudinal aperture 16 and a plurality of narrow passageways 18. The ends 20, 22 of a length of composite strand 24 are inserted into a passageway 18 to form a closed loop 26. An optional end cap 30 for eye injury prevention can be attached at the uppermost end of stake 12, which can be of any desired length. Additionally, the coupling element 14 can formed with a plurality of differently oriented passageways to enable differently-oriented support strands to be received to provide differently-positioned loops to support a wide variety of plant forms.

The lowermost, outer loop 26 shown in FIG. 1 is a relatively large diameter loop, while the innermost loop 28 is a relatively small diameter loop that can be formed by pulling outwardly n strand nds 20 and 22. After the desired loop diameter has been achieved, the excess strand material at the outer ends 20 and 22 can be cut off, if desired, to provide a closed loop without extending ends, as shown by upper loop 26 in FIG. 1.

Composite Materials

The term "composite" as used in the present specification and claims is defined as those materials formed by distributing extremely strong and stiff, continuous, chopped, or a mixture of continuous and chopped fibers in a polymer resin matrix or binder.

The term "high modulus fiber reinforcement" as used in the present specification and claims is defined as fibers that each have an average modulus of at least 5,000,000 psi, preferably 15,000,000 psi, and most preferably at least 30,000,000 psi.

The term "plastic resin matrix or binder" as used in the present specification and claims is defined as any thermosetting or thermoplastic resin with a minimum modulus of about 250,000 psi, preferably about 325,000 psi, and most preferably, at least about 400,000 psi; a minimum tensile strength of about 6,000 psi, preferably about 10,000 psi, and most preferably at least about 12,000 psi; and glass transition temperature ($T_g$) of at least about 50° C., preferably at least about 75° C., and most preferably, at least about 100° C.

Preferred examples of high modulus fiber reinforcement materials include carbon fibers, aramid fibers, glass fibers, polyolefin fibers, boron fibers, and the like. Most preferred are carbon fibers, either alone or in combination with other fibers.

Preferred examples of the plastic resin matrix or binder include plastic resins such as nylon, high-strength polyethylene, liquid-crystalline polyethylene, epoxy resins, cyanurates, polyesters, polyurethanes, and the like. Most preferred are epoxy-type and polyester type thermoset resins and nylon-type thermoplastic resins.

Generally, the high modulus fibers used herein are typically at least about 50 times stronger and at least about 20–150 times stiffer than the plastic resin matrix in which they are carried. The role of the matrix is primarily that of a glue or binder that enables the combination or array of high modulus fibers to support the applied loads. In the composites used in the present invention, the ratio of high modulus fibers to plastic resin matrix is preferably from about 30:70 to about 70:30 by volume, more preferably, from about 40:60 to about 60:40 by volume.

The high modulus fibers and plastic resin matrix or binder that are combined to form composites used in the present invention can be combined using any readily available composite fabrication technique. Pultrusion is one preferred method when economics of scale and high speed are required, especially when the core layer is being produced with an angle of 0°. Other alternative constructions are circular winding, filament winding, injection molding, braiding, resin transfer molding, and roll wrapping, as well as combinations of those techniques.

The present invention has many unique and significant advantages over the approaches previously utilized. In contrast to the use of either metal, thermoset plastic tubing, or thermoplastic tubing, the use of high modulus fiber plastic matrix reinforced composite tubing results in a dramatic reduction both in weight and in overall part dimensions, and without a loss of strength. The lower weight without a loss in strength allows a thinner stake or a thinner flexible element so that the plant support is less obtrusive, is lighter to ship and handle, and requires less material.

Reinforced composites formed from a high modulus, long-fiber/plastic matrix are desired over reinforced composites formed from a high modulus, short-fiber/plastic matrix because of their overall superior strength and stiffness. Oriented high modulus, long-fiber/plastic matrix reinforced composites are even more preferred because of their even higher strength and stiffness. Additionally, high modulus fiber plastic matrix reinforced composites, because of their high stiffness, dimensional stability, and acoustic properties, do not dampen or significantly distort sound. Further, for thin elements, dimensional memory is superior to metals at thinner dimensions, a critical issue regarding the flexible lateral support element.

Accordingly, unlike unreinforced plastics or high modulus, short-fiber/plastic matrix reinforced composites, high modulus, long-fiber plastic/matrix reinforced composites have metal-like properties and suggest a quality appearance. Unlike metals, and more easily than most plastics, composites can be readily coated for decorative purposes, and they will not corrode.

Composite Stakes

While numerous variations of profiles or cross-sections can be used in forming stakes 12, the specific profile will be chosen to achieve a certain set of desired, non-isotropic properties with no voids. For example, C channels and I-beam cross sections are commonly utilized to achieve greater stiffness and strength in one direction while minimizing material usage. Alternatively, solid rods with no voids and with circular or square cross sections can be used where higher damage tolerance or higher general robustness is desired. Accordingly, weight limitations coupled with the specific cross-section geometry used serve to define the final dimensions (e.g., mean diameter) of the solid member. An example of a situation where damage tolerances can be required to be greater is on parts that can be subject to repetitive physical abuse.

Fiber angles of the fibers within the stakes can be either a combination of high and low angles to the axis of the member to impart maximum rigidity and strength per unit weight, or a single angle for ease of manufacturing and lower cost. With a pultrusion process a single angle of zero degrees can be used.

The stakes are preferably, but are not required to be, made from the same basic materials and process, but are typically made with carbon fiber, glass fiber, or a mixture of the two in solid rods or tubes with outside diameters of from about 0.05 inches to about 1.0 inch, most typically from about 0.15 inches to about 0.5 inches. The composite strand and stakes are available from firms such as Diversified Composites and its subsidiaries, based in Florence, Ky.

The composite strand can be about 100 mils or less in diameter, preferably less than about 50 mils, and most preferably less than about 30 mils in diameter or average width, with about 65% by volume carbon fiber dispersed in a thermosetting resin such as a polyester or epoxy or a thermoplastic resin such as nylon, an olefin, or a polyurethane and manufactured utilizing a pultrusion process.

Coupling Elements

The coupling elements described herein can be made of any suitable materials, including molded plastics containing light weight fillers, such as microballoons and other low-density fillers.

The coupling components can be machined or molded, and the typical materials are nylon, ABS, phenolic or similar resins, either as a thermoplastic or a thermoset, with or without continuous or discontinuous reinforcements, fillers, and other additives.

To enhance friction, inserts for any of the through passageways in the coupling elements can be made from an elastomeric material, such as a silicone, urethane, or butadiene polymer, or from a foamed material. The inserts can contain the through passageways and the carbon strand can thereby be retained with a higher degree of friction when in contact with the elastomeric surface, even at sub-freezing temperatures. The inserts can be dumbbell shaped, to provide a force fit of the inserts within the coupling element, yet upon insertion of the composite strand, the force will be insufficient to dislodge the insert.

The passageways through the coupling elements can be oriented in different directions, including parallel to the stake axis, a feature dramatically enabled by the relatively narrow dimensions possible with a flexible, fiber reinforced composite, non-kinking, substantially constant profile element. The different directions allow for multiple strands to be passed through a single coupling element, to be configured into a vast array of shapes and conformations from one length of the flexible element. Finally, a vast array of conformations are possible, from simple lines and loops, to rosettes, multiple overlapping or adjacent loops, helical structures, and the like, for supporting groups of plants or multi-stemmed plants of variable conformation with just the three basic elements of this invention.

Memory for the Composite Strand

Very thin fiber-reinforced composites, having a diameter of about 100 mils or less, typically oriented fiber, have the unique property of structural memory over a large degree of deformation. This property allows for the formation from such materials of curved elements on demand by simply adjusting the points of fixation of the material, along its length, relative to the coupling element. Furthermore, that property allows for elastic deformation of the curved elements under stress without breakage. In the case of a plant support, the plant's own weight along with the added weight of water from rain or from irrigation, the loads imposed on the plant by animals brushing against the plant, or the force of the wind, can lead to plant breakage and damage. The ability of the support to maintain strength in one dimension, but also to have by design both flexibility and memory in other dimensions, enables a plant support that can move and adjust with movement of the plant under a wider range of loads without damaging the plants, unlike a conventional metal strand and rigid heavy plastic or fiberglass loop-type supports. Furthermore, those beneficial results can be achieved at very low relative material masses and volumes, thereby providing a plant support that is not as visible to the eye upon casual visual observation as the aforementioned metal strand supports. As already noted, the preferred composite materials are not subject to corrosion, like metals.

Memory for Composite Stakes

Stakes formed from the composite materials can have a similar memory property, but not necessarily to the same extent as the loop-type supports. That property allows mild deformation of a stake to resist wind and the weight effects of fruit, as well as water from rain, dew, or irrigation, for example. Again, particularly for rigid plant stems, that property prevents catastrophic plant damage under the aforementioned conditions.

Coupling Elements

The coupling elements can alternatively be made entirely or substantially of a foamed material, either closed cell or open cell, or of an elastomeric material. In those cases passageways can or can not initially be present for use. One could simply push the strand or the stake through the coupling element. Many foams and elastomers can be punctured by the composite stakes and the composite strands on demand to provide a friction fit at any location desired in the coupling element without the need for complex molding or machining operations. The coupling element can optionally be made from a urethane, styrenic, or olefinic foam, or the like, or an elastomer that is based upon a urethane, a diene polymer, or the like. Alternatively, inserts made from such materials can be placed within a polymer matrix, either reinforced or unreinforced. It should also be noted that the coupling elements do not all have to be on a stake—they can instead be suspended in space by being held by the strands themselves, even if only one stake is present, or if no stake is present.

Figure 2:
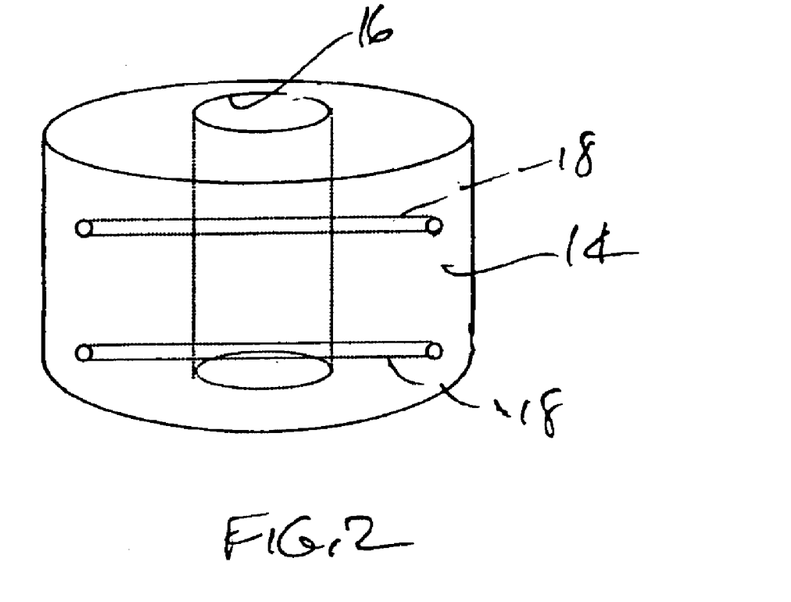
FIG. 2 is a perspective view of one form of coupling element for receiving plant support strands.
Figure 3:
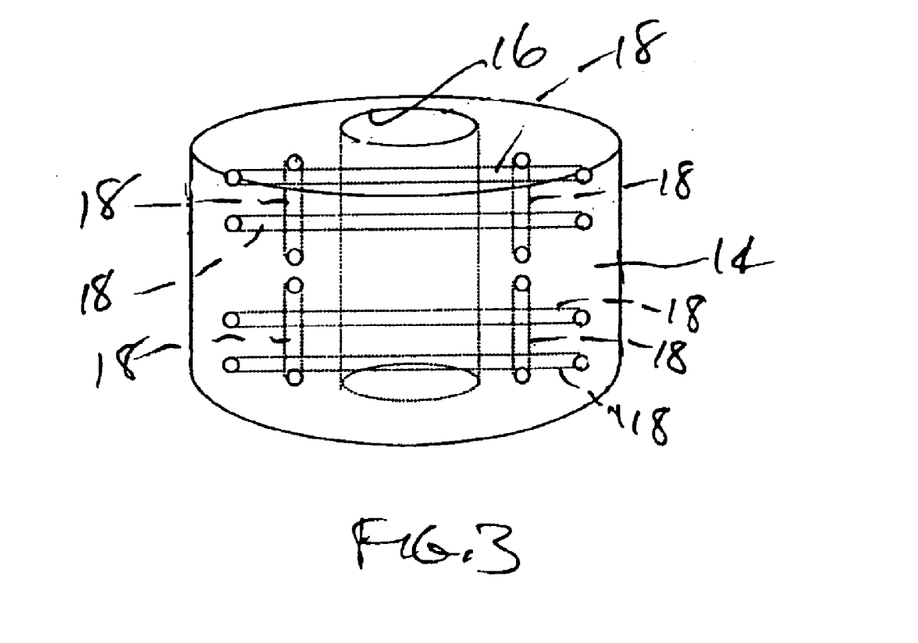
FIG. 3 is a perspective view similar to that of FIG. 2 and showing another coupling element configuration.

FIGS. 2 and 3 show coupling elements with different passageway arrangements. In FIG. 2, coupling element 14 has two passageways 18 that are offset from longitudinal aperture 16 and are substantially parallel to each other, although they can also be skewed angularly relative to each other if desired. Additionally, passageways 18 can lie in different transverse planes, as shown, or they can lie in the same transverse plane. Indeed, passageways 18 can be of any desired number and can vary widely in their relative position to each other.

Figure 4:
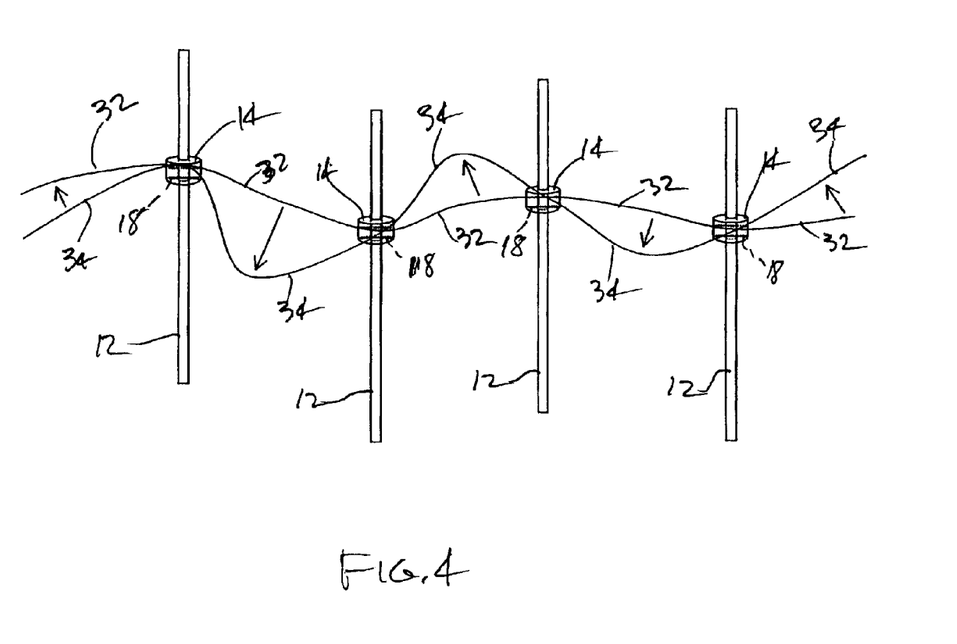
FIG. 4 is a perspective view of one configuration of plant supports utilizing a plurality of plant supports in accordance with the present invention.

FIG. 4 shows an example of a multi-stake configuration. Four stakes 12 are shown in a substantially rectangular configuration. Coupling elements 14 can have passageways 18 that are perpendicular to each other so that composite strands 32, 34 also pass through the coupling elements in a manner that orients the strands perpendicular to each other as they pass through the respective passageways. Accordingly, the portions of the strands positioned between adjacent stakes define non-circular plant support elements.

Figure 5:
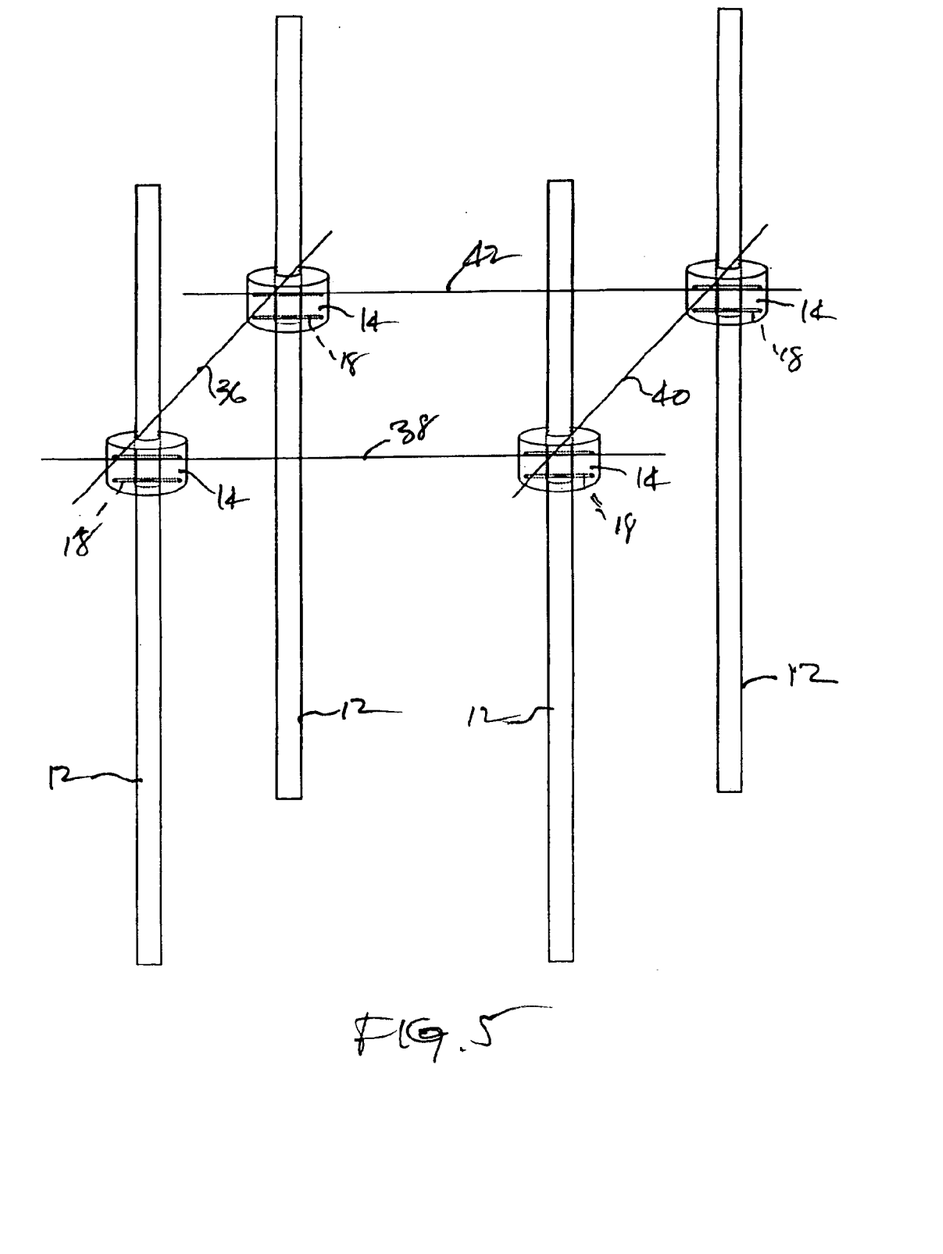
FIG. 5 is a perspective view similar to that of FIG. 4, but showing another configuration of plant supports utilizing a plurality of plant supports in accordance with the present invention.

FIG. 5 shows another plant support configuration in which four stakes 12 are disposed in a square array. Coupling elements 14 each have a pair of passageways 18 that are oriented perpendicular to each other. Strands 36, 38, 40, and 42 are disposed to define a square plant support configuration is directed to a line or loop of stakes with one composite strand. If desired, a single strand can be utilized to extend between each of the respective stakes 12 to provide the desired square support configuration.

Figures 6, 7:
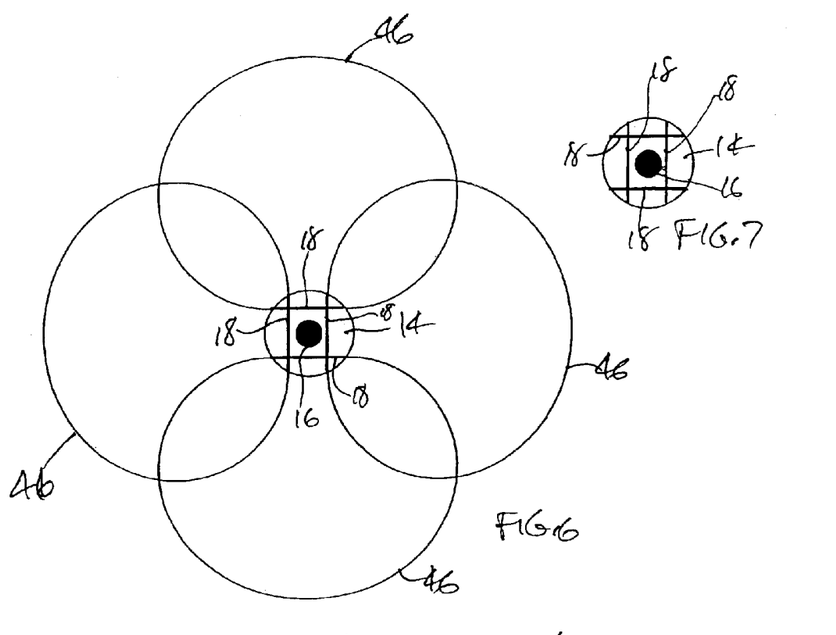
FIG. 6 is a transverse cross-sectional view of one form of plant support utilizing a single stake.
FIG. 7 is a transverse cross-sectional view of a coupling element used with the plant support shown in FIG. 6.

FIG. 6 shows a further plant support configuration in which four support loops 46 are held by a single coupling element 14. Two pairs of parallel passageways 18 that are perpendicularly disposed relative to another pair of parallel passageways 18 enable the four support loops to be readily formed. Although shown as being substantially equal size loops, it will be apparent that the loops can each be of a different size, to accommodate the particular plant structure to be supported. Moreover, the loops can lie in different horizontal planes, or they can define planes that are angularly disposed relative to each other.

FIG. 7 shows a coupling element 14 having passageways 18 arranged in a perpendicular pattern that is utilized to provide the plant support pattern shown in FIG. 6.

Figure 8:
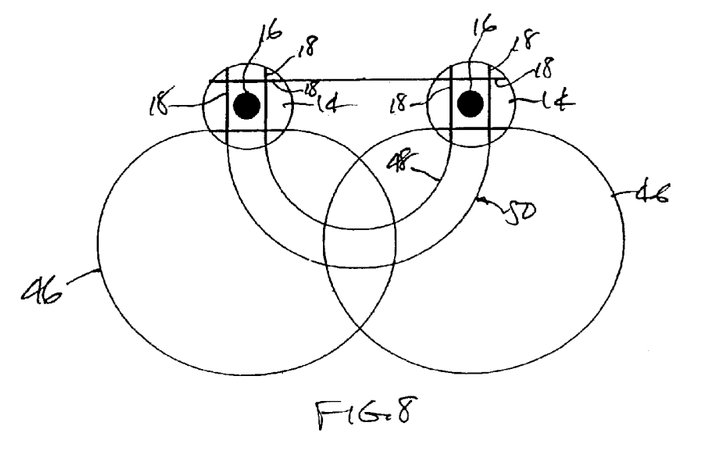
FIG. 8 is a transverse cross-sectional view of another form of plant support utilizing a pair of stakes.

The same coupling passageway pattern can be utilized to provide concentric loops, if desired, such as concentric loops 48, 50 as shown in FIG. 8. In short, a wide variety of support loop configurations are possible utilizing the elements of the present invention, which can accommodate a wide variety of plant stalk and branch orientation variations.

Further variations and advantages of the present plant support invention are further illustrated by means of the following examples and Comparisons. All parts and percentages are by weight and all temperatures are degrees Celsius unless otherwise indicated.

EXAMPLE 1

For Supporting a Tall, Multi-Stemmed Flower with Rigid Stems

Take one 60 inch stake and attach a coupling element from the bottom end, or if a snap-on coupling element is utilized, simply snap it on at the desired location along the length of the stake. Take about 20 inches of composite strand in accordance with the present invention and put each end of the strand through a lateral passageway in the coupling element to form a circle, leaving about 4 inches of composite strand extending from the coupling element at each strand end. Place the stake into the ground such that the circular strand form is centered over the plant. Allow the plant to grow through the circular support. If needed as the plant grows, the strand loop can be enlarged by drawing the strand through the coupling element to reduce the length of a free end or both free ends of strand material that extends beyond the coupling element. Finally, as the plant's size increases further in diameter, the loops can be outwardly adjusted by the plant itself if enough force is provided as the plant grows. The coupling element with the circular support can also be vertically adjusted, if desired or if necessary. As noted earlier, the coupling element can optionally be made of a urethane, styrenic, or olefinic foam or the like, or an elastomer based upon a urethane, a diene polymer, or the like. Alternatively, inserts of such materials can be positioned within a polymer matrix, either reinforced or unreinforced.

EXAMPLE 2

For Supporting a Tomato Plant or a Similarly Configured Single Plant

Take one 48 inch to 96 inch stake and attach 2 or more coupling elements through the bottom of the stake, or if a snap-on coupling element is utilized, simply snap it on at the desired location along the length of the stake. If snap-on coupling elements are utilized they can be added at any time without removing the stake from the ground. Take 36 inches of composite strand and form a figure eight by passing the strand through the lateral passageways of each coupling element. The strand gets passed through one passageway until the center of the strand is within a lateral coupling passageway. The two ends are then wound opposite each other with the ends put into additional or the same lateral coupling element passageways. An excess of composite strand can be left to extend outwardly beyond the passageways to allow for future expansion or contraction adjustment, either manually or by forces resulting from the plant's own growth. The coupling elements with the figure eight supports can also be vertically adjusted. Alternatives with optionally more strand can include other forms, such as cloverleaf formations, rosettes, or circles within circles, depending upon the plant's unique growth habits. A single composite strand can also be snaked through to form either a single helix or two opposite helices to form a cage.

EXAMPLE 3

For Supporting a Mass of Multiple Plants

Place a series of two or more stakes in the ground with one or more coupling elements around the mass of flowers or the area where the plants will later be growing. Pass the composite strand through the coupling elements, adjusting the tension so that a form is provided to correspond with the shape of the bed or of the planted area. The two ends can, but do not have to, end at the same stake, with an excess left for future expansion or contraction adjustment, either manually or by the plant's own growth. The stakes can be lifted from the ground, with strand within the attached coupling elements, for further adjustment, whether plants are there or not. An option is to use multiple coupling elements on each stake and to helically pass the strand through the coupling elements to add layers of support. A single strand or multiple strands can be used. The strands can be made to cross over each other to form a grid to support multi-stemmed plants over a small or a large area. Multiple grid layers can also be formed.

EXAMPLE 4

For Supporting a Vine

Take a coupling element with both vertical and lateral passageways and pass the composite strand through the passageways to form either vertical, horizontal, or another three-dimensional strand structure. A specific example is a single vertical and two horizontal cloverleaf structures, each based upon 36 inches of composite strand, on four coupling elements placed upon a 96 inch stake. The structure is put into the ground and the vining plant can then grow through the various loops. Excess strand can again be left for future expansion or contraction adjustment, either manually or by the plant's own growth. Coupling elements can be used to fix the proportional relative locations of cross points by placing the composite strand through them in free space, not attached to the stake.

EXAMPLE 5

A Grid of Stakes and Strands for Supporting Multiple Plants or a Single Vine Similar to example 3, but here the stakes form an ordered or random grid. A square array with 24 inch separations between stakes and 5 coupling elements spaced at 18 inch intervals on 84 inch stakes can be used to support a mass of individual tomato plants. A 36 inch wide row of some other finite length would afford ease of harvest, disassembly, and/or maintenance.

Although the invention has been described above with reference to specific embodiments thereof, it is apparent that many changes, modifications, and variations can be made without departing from the inventive concept disclosed herein. Accordingly, it is intended to embrace within the appended claims all such changes, modifications, and variations that fall within the spirit and broad scope of the invention. The disclosures of all patent applications, patents, and other publications cited herein are hereby incorporated by reference in their entirety.

What is claimed is:

1. A plant support system comprising:
   at least one stake adapted to be pressed into soil adjacent to a plant to provide a substantially rigid support for the plant support system;
   at least one coupling element engageable with an outer surface of the at least one stake and having a least one through-passageway that is spaced from the outer surface of the at least one stake for receiving a plant restraint member, a plant restraint in the form of a thin, flexible strand of self-supporting material having a substantially constant cross section adapted to be slidably received and frictionally retained within the at least one through-passageway in the coupling element, said plant restraint defining a flexible limiting member for supporting and for limiting movement of an adjacent plant, wherein the strand is made from an oriented, anisotropic, continuous, fiber-reinforced polymer matrix selected from the group consisting of thermoplastic resins and thermosetting resins, and has a minimum modulus of about 250,000 psi, a minimum tensile strength of about 6,000 psi, and a glass transition temperature of at least 50° C., wherein the polymer matrix includes a high modulus fiber reinforcement selected from the group consisting of carbon fibers, aramid fibers, glass fibers, polyolefin fibers, boron fibers, and mixtures thereof, and wherein the strand has a memory that causes the strand to attempt to return to an original linear form.

2. A plant support system in accordance with claim 1, wherein said coupling element is frictionally received on the at least one stake and is movable along the stake to permit adjustment of coupling element position on the stake.

3. A plant support system in accordance with claim 1, wherein said polymer matrix is selected from the group consisting of epoxy polymers and polyester thermosetting polymers.

4. A plant support system in accordance with claim 1, wherein said polymer matrix is a nylon thermoplastic resin having a minimum modulus of about 325,000 psi, a minimum tensile strength of about 10,000 psi, and glass transition temperature of at least about 75° C.

5. A plant support system in accordance with claim 1, wherein the fiber content of the polymer matrix is from about 70:30 to about 30:70 by volume.

6. A plant support system in accordance with claim 1, wherein at least one of the plant restraint and the at least one stake is formed by a pultrusion process.

7. A plant support system in accordance with claim 1, wherein the plant restraint and the at least one stake are formed from high modulus fibers selected from the group consisting of carbon fibers, glass fibers, and mixtures thereof.

8. A plant support system in accordance with claim 1, wherein the plant restraint has a non-circular cross section to minimize twisting of the plant restraint relative to the coupling element.

9. A plant support system in accordance with claim 8, wherein the cross-sectional profile of the plant restraint is selected from the group consisting of a square, a rectangle, a trapezoid, a circle, an ellipse, a triangle, a polygon having at least five sides, and a star.

10. A plant support system in accordance with claim 1 wherein the plant restraint has a cross section in which the smallest cross-sectional dimension is no more than about 0.250 inches.

11. A plant support system in accordance with claim 1, wherein the cross sectional profile of the at least one stake is selected from the group consisting of a square, a rectangle, a trapezoid, a circle, an ellipse, a triangle, a polygon having at least five sides, and a star.

12. A plant support system in accordance with claim 1, wherein the coupling element has at least two through-passageways for receiving said plant restraint.

13. A plant support system in accordance with claim 12, wherein the through-passageways lie in different planes.

14. A plant support system in accordance with claim 1, wherein the coupling element has at least four through-passageways for receiving said plant restraint.

15. A plant support system in accordance with claim 1, including at least two coupling elements that each receive at least one plant restraint.

16. A plant support system in accordance with claim 1, wherein the through-passageways in the coupling element include inserts having passageways adapted to receive plant restraints.

17. A plant support system in accordance with claim 16, wherein the inserts are dumbbell-shaped and are formed from materials selected from the group consisting of glassy polymers, elastomeric polymers, and foamed polymers.

18. A plant support system in accordance with claim 17, wherein the inserts are formed from materials selected from the group consisting of urethane polymers and isocyanate-based polymers.

19. A plant support system in accordance with claim 1, wherein the at least one stake includes a rounded end member having a cross-sectional dimension of at least 0.750 inches in two substantially perpendicular planes that are both substantially perpendicular to the at least one stake for preventing injury.

20. A plant support system in accordance with claim 1, wherein the at least one stake is formed from an oriented, high-modulus fiber-reinforced polymer matrix composite.

21. A plant support system in accordance with claim 1, wherein fibers contained within the polymer matrix have an average modulus of at least 5,000,000 psi.

* * * * *